United States Patent
Kaplan et al.

(10) Patent No.: US 9,036,499 B2
(45) Date of Patent: *May 19, 2015

(54) MULTI-PROTOCOL TELECOMMUNICATIONS ROUTING OPTIMIZATION

(71) Applicant: PATENTMARKS COMMUNICATIONS, LLC, Arlington, VA (US)

(72) Inventors: Allen D. Kaplan, Miami Beach, FL (US); William F. McCarthy, Erie, PA (US)

(73) Assignee: PATENTMARKS COMMUNICATIONS, LLC, Camden, DE (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/800,341

(22) Filed: Mar. 13, 2013

(65) Prior Publication Data
US 2013/0272299 A1   Oct. 17, 2013

Related U.S. Application Data

(63) Continuation of application No. 11/948,746, filed on Nov. 30, 2007, now Pat. No. 8,400,926, which is a
(Continued)

(51) Int. Cl.
*H04L 12/28* (2006.01)
*H04L 12/64* (2006.01)
(Continued)

(52) U.S. Cl.
CPC ............ *H04L 12/64* (2013.01); *H04L 12/5692* (2013.01); *H04L 29/06* (2013.01);
(Continued)

(58) Field of Classification Search
CPC ..... H04L 12/64; H04L 12/5692; H04L 29/06; H04L 45/123; H04L 45/124; H04L 41/08; H04L 43/0852; H04L 69/18
USPC ......... 370/229–230, 232–233, 235, 237–238, 370/250, 252–253, 351–356, 465–467; 379/219, 220.01, 221.01, 221.05, 379/242–243
See application file for complete search history.

(56) References Cited

U.S. PATENT DOCUMENTS

| | | | |
|---|---|---|---|
| 4,054,756 A | 10/1977 | Comella et al. | |
| 4,074,232 A | 2/1978 | Otomo et al. | |

(Continued)

FOREIGN PATENT DOCUMENTS

| | | | |
|---|---|---|---|
| DE | 0 581 087 A1 | 7/1992 | |
| EP | 0247793 A2 | 12/1987 | |

(Continued)

OTHER PUBLICATIONS

Tedijanto T. et al., "NBBS Path Selection Framework", ISM Systems Journal, IBM Corp., (Sep. 21, 1995), pp. 629-639, Issn: 0018-8670, vol. 34, No. 4, 21, Armonk, New York, US.
(Continued)

*Primary Examiner* — Kevin Mew
(74) *Attorney, Agent, or Firm* — Hershkovitz & Associates, PLLC; Abe Hershkovitz

(57) ABSTRACT

A telecommunications switching system employing multi-protocol routing optimization which utilizes predetermined and measured parameters in accordance with a set of user priorities in determining the selection of a telecommunications path to be utilized for transmitting a data file to a remote destination. The switching system has a first memory for storing the data file to be transferred, a second memory for storing predetermined parameters such as cost data associated with each of the telecommunications paths, a third memory for storing a set of user priorities regarding the transmission of data files, and means for measuring the value of variable parameters such as file transfer speed associated with each of the telecommunications paths. Processor means are operatively associated with the second and third memories and the variable parameter measuring means for determining which of the plurality of telecommunications paths should be utilized for transferring the data file in accordance with the set of user priorities, the predetermined telecommunications path parameters, and the measured variable parameters. The switching system further comprises input means for allowing a user to change the user priorities in the third memory prior to transmitting a file.

20 Claims, 2 Drawing Sheets

Related U.S. Application Data continuation of application No. 10/157,611, filed on May 29, 2002, now Pat. No. 7,307,956, which is a continuation of application No. 09/665,399, filed on Sep. 20, 2000, now Pat. No. 6,473,404, which is a continuation of application No. 09/198,687, filed on Nov. 24, 1998, now Pat. No. 6,144,641, which is a continuation of application No. 08/741,130, filed on Oct. 31, 1996, now Pat. No. 6,016,307.

(51) Int. Cl.
    *H04L 12/54*     (2013.01)
    *H04L 29/06*     (2006.01)
    *H04L 12/721*     (2013.01)
    *H04L 12/24*     (2006.01)
    *H04L 12/26*     (2006.01)

(52) U.S. Cl.
    CPC ............ *H04L 41/08* (2013.01); *H04L 43/0852* (2013.01); *H04L 45/123* (2013.01); *H04L 45/124* (2013.01); *H04L 69/18* (2013.01)

(56) References Cited

U.S. PATENT DOCUMENTS

| | | | |
|---|---|---|---|
| 4,100,377 A | 7/1978 | Flanagan | |
| 4,112,258 A | 9/1978 | Alles | |
| 4,135,156 A | 1/1979 | Sanders, Jr. et al. | |
| 4,168,400 A | 9/1979 | de Couasnon et al. | |
| 4,320,500 A | 3/1982 | Barberis et al. | |
| 4,484,326 A | 11/1984 | Turner | |
| 4,491,495 A | 1/1985 | Muscoplat | |
| 4,494,230 A | 1/1985 | Turner | |
| 4,495,566 A | 1/1985 | Dickenson et al. | |
| 4,506,358 A | 3/1985 | Montgomery | |
| 4,516,239 A | 5/1985 | Maxemchuk | |
| 4,525,830 A | 6/1985 | Cohen et al. | |
| 4,534,024 A | 8/1985 | Maxemuchuk et al. | |
| 4,550,402 A | 10/1985 | Gable et al. | |
| 4,566,095 A | 1/1986 | Devault et al. | |
| 4,598,400 A | 7/1986 | Hillis | |
| 4,616,359 A | 10/1986 | Fontenot | |
| 4,630,259 A | 12/1986 | Larson et al. | |
| 4,630,261 A | 12/1986 | Irvin | |
| 4,644,532 A | 2/1987 | George et al. | |
| 4,646,287 A | 2/1987 | Larson et al. | |
| 4,653,045 A | 3/1987 | Stanley et al. | |
| 4,661,947 A | 4/1987 | Lea et al. | |
| 4,663,758 A | 5/1987 | Lambarelli et al. | |
| 4,667,324 A | 5/1987 | Graves | |
| 4,679,189 A | 7/1987 | Olson et al. | |
| 4,679,190 A | 7/1987 | Dias et al. | |
| 4,703,475 A | 10/1987 | Dretzka et al. | |
| 4,703,477 A | 10/1987 | Adelmann et al. | |
| 4,736,363 A | 4/1988 | Aubin et al. | |
| 4,769,810 A | 9/1988 | Eckberg, Jr. et al. | |
| 4,769,811 A | 9/1988 | Eckberg, Jr. et al. | |
| 4,771,424 A | 9/1988 | Suzuki et al. | |
| 4,771,425 A | 9/1988 | Baran et al. | |
| 4,813,037 A | 3/1989 | Deuysscher et al. | |
| 4,819,228 A | 4/1989 | Baran et al. | |
| 4,825,206 A | 4/1989 | Brice, Jr. et al. | |
| 4,870,678 A | 9/1989 | Adachi | |
| 4,893,307 A * | 1/1990 | McKay et al. | ............... 370/389 |
| 4,894,822 A | 1/1990 | Buhrke et al. | |
| 4,903,261 A | 2/1990 | Baran et al. | |
| 4,905,233 A | 2/1990 | Cain et al. | |
| 4,907,724 A | 3/1990 | Wing, Jr. et al. | |
| 4,912,656 A | 3/1990 | Cain et al. | |
| 4,969,184 A | 11/1990 | Gordon et al. | |
| 4,972,464 A | 11/1990 | Webb et al. | |
| 4,974,224 A | 11/1990 | Boone | |
| 4,979,100 A | 12/1990 | Makris et al. | |
| 4,979,206 A | 12/1990 | Padden et al. | |
| 4,994,926 A | 2/1991 | Gordon et al. | |
| 4,996,707 A | 2/1991 | O'Malley et al. | |
| 5,012,511 A | 4/1991 | Hanle et al. | |
| 5,018,191 A | 5/1991 | Catron et al. | |
| 5,021,949 A * | 6/1991 | Morten et al. | ............... 709/231 |
| 5,029,196 A | 7/1991 | Morganstein | |
| 5,068,888 A | 11/1991 | Scherk et al. | |
| 5,088,032 A | 2/1992 | Bosack | |
| 5,095,480 A | 3/1992 | Fenner | |
| 5,115,433 A | 5/1992 | Baran et al. | |
| 5,115,495 A | 5/1992 | Tsuchiya et al. | |
| 5,117,422 A | 5/1992 | Hauptschein et al. | |
| 5,132,992 A | 7/1992 | Yurt et al. | |
| 5,146,348 A | 9/1992 | Kaneyama | |
| 5,146,488 A | 9/1992 | Okada et al. | |
| 5,150,357 A | 9/1992 | Hopner et al. | |
| 5,159,595 A | 10/1992 | Flanagan et al. | |
| 5,159,624 A | 10/1992 | Makita | |
| 5,163,042 A | 11/1992 | Ochiai | |
| 5,170,266 A | 12/1992 | Marsh et al. | |
| 5,193,110 A | 3/1993 | Jones et al. | |
| 5,204,894 A | 4/1993 | Darden | |
| 5,206,856 A | 4/1993 | Chung | |
| 5,210,743 A | 5/1993 | Eilenberger et al. | |
| 5,233,604 A | 8/1993 | Ahmadi et al. | |
| 5,241,588 A | 8/1993 | Babson, III et al. | |
| 5,247,571 A | 9/1993 | Kay et al. | |
| 5,251,209 A * | 10/1993 | Jurkevich et al. | ............... 370/468 |
| 5,253,275 A | 10/1993 | Yurt et al. | |
| 5,268,957 A | 12/1993 | Albrecht | |
| 5,274,625 A | 12/1993 | Derby et al. | |
| 5,287,199 A | 2/1994 | Zoccolillo | |
| 5,289,536 A | 2/1994 | Hokari | |
| 5,291,481 A | 3/1994 | Doshi et al. | |
| 5,311,583 A | 5/1994 | Friedes et al. | |
| 5,317,562 A | 5/1994 | Nardin et al. | |
| 5,317,566 A | 5/1994 | Joshi | |
| 5,323,389 A | 6/1994 | Bitz et al. | |
| 5,323,450 A | 6/1994 | Goldhagen et al. | |
| 5,329,635 A | 7/1994 | Wadin et al. | |
| 5,333,266 A | 7/1994 | Boaz et al. | |
| 5,337,352 A | 8/1994 | Kobayashi et al. | |
| 5,341,366 A | 8/1994 | Soumiya et al. | |
| 5,384,835 A | 1/1995 | Wheeler et al. | |
| 5,390,169 A | 2/1995 | Bernstein | |
| 5,390,339 A | 2/1995 | Bruckert et al. | |
| 5,396,536 A | 3/1995 | Yudkowsky | |
| 5,396,542 A | 3/1995 | Alger et al. | |
| 5,398,012 A | 3/1995 | Derby et al. | |
| 5,398,245 A | 3/1995 | Harriman, Jr. | |
| 5,402,478 A | 3/1995 | Hluchyj et al. | |
| 5,406,557 A | 4/1995 | Baudoin | |
| 5,408,469 A | 4/1995 | Opher et al. | |
| 5,414,698 A | 5/1995 | Adams | |
| 5,425,085 A | 6/1995 | Weinberger et al. | |
| 5,425,091 A | 6/1995 | Josephs | |
| 5,428,608 A | 6/1995 | Freeman et al. | |
| 5,440,620 A | 8/1995 | Slusky | |
| 5,444,707 A | 8/1995 | Cerna et al. | |
| 5,446,726 A * | 8/1995 | Rostoker et al. | ............... 370/232 |
| 5,448,633 A | 9/1995 | Jamaleddin et al. | |
| 5,450,411 A | 9/1995 | Heil | |
| 5,452,289 A | 9/1995 | Sharma et al. | |
| 5,452,351 A | 9/1995 | Yamamoto | |
| 5,459,717 A | 10/1995 | Mullan et al. | |
| 5,459,775 A | 10/1995 | Isono et al. | |
| 5,463,577 A | 10/1995 | Oowaki et al. | |
| 5,469,500 A | 11/1995 | Satter et al. | |
| 5,471,519 A | 11/1995 | Howe et al. | |
| 5,471,644 A | 11/1995 | Schatz et al. | |
| 5,473,599 A | 12/1995 | Li et al. | |
| 5,473,608 A | 12/1995 | Gagne et al. | |
| 5,473,679 A | 12/1995 | La Porta et al. | |
| 5,475,689 A | 12/1995 | Kay et al. | |
| 5,475,732 A | 12/1995 | Pester, III | |
| 5,477,531 A | 12/1995 | McKee et al. | |
| 5,479,401 A | 12/1995 | Bitz et al. | |
| 5,483,586 A | 1/1996 | Sussman | |
| 5,483,587 A | 1/1996 | Hogan et al. | |

(56) References Cited

U.S. PATENT DOCUMENTS

| | | |
|---|---|---|
| 5,488,651 A | 1/1996 | Giler et al. |
| 5,490,252 A | 2/1996 | Macera et al. |
| 5,491,693 A | 2/1996 | Britton et al. |
| 5,495,484 A | 2/1996 | Self et al. |
| 5,495,521 A | 2/1996 | Rangachar |
| 5,509,000 A | 4/1996 | Oberlander |
| 5,511,111 A | 4/1996 | Serbetcioglu et al. |
| 5,511,168 A | 4/1996 | Perlman et al. |
| 5,519,704 A | 5/1996 | Farinacci et al. |
| 5,519,758 A | 5/1996 | Tabbane |
| 5,521,719 A | 5/1996 | Yamada |
| 5,521,916 A | 5/1996 | Choudhury et al. |
| 5,521,924 A | 5/1996 | Kakuma et al. |
| 5,524,137 A | 6/1996 | Rhee |
| 5,526,353 A | 6/1996 | Henley et al. |
| 5,526,416 A | 6/1996 | Dezonno et al. |
| 5,528,677 A | 6/1996 | Butler et al. |
| 5,530,904 A | 6/1996 | Koga |
| 5,532,939 A | 7/1996 | Psinakis et al. |
| 5,539,884 A | 7/1996 | Robrock, II |
| 5,541,914 A | 7/1996 | Krishnamoorthy et al. |
| 5,541,917 A | 7/1996 | Farris |
| 5,541,927 A | 7/1996 | Kristol et al. |
| 5,541,930 A | 7/1996 | Klingman |
| 5,548,506 A | 8/1996 | Srinivasan |
| 5,550,863 A | 8/1996 | Yurt et al. |
| 5,551,025 A | 8/1996 | O'Reilly et al. |
| 5,553,124 A | 9/1996 | Brinskele |
| 5,553,131 A | 9/1996 | Minervino, Jr. et al. |
| 5,559,721 A | 9/1996 | Ishii |
| 5,561,670 A | 10/1996 | Hoffert et al. |
| 5,561,840 A | 10/1996 | Alvesalo et al. |
| 5,563,882 A | 10/1996 | Bruno et al. |
| 5,563,930 A | 10/1996 | Pester, III |
| 5,574,780 A | 11/1996 | Andruska et al. |
| 5,579,472 A | 11/1996 | Keyworth, II et al. |
| 5,581,706 A | 12/1996 | Jessup, Jr. et al. |
| 5,590,127 A | 12/1996 | Bales et al. |
| 5,590,171 A | 12/1996 | Howe et al. |
| 5,590,181 A | 12/1996 | Hogan et al. |
| 5,596,719 A | 1/1997 | Ramakrishnan et al. |
| 5,602,909 A | 2/1997 | Carkner et al. |
| 5,604,682 A | 2/1997 | McLaughlin et al. |
| 5,604,737 A | 2/1997 | Iwami et al. |
| 5,608,446 A | 3/1997 | Carr et al. |
| 5,608,786 A | 3/1997 | Gordon |
| 5,610,910 A | 3/1997 | Focsaneanu et al. |
| 5,610,916 A | 3/1997 | Kostreski et al. |
| 5,617,422 A | 4/1997 | Litzenberger et al. |
| 5,619,555 A | 4/1997 | Fenton et al. |
| 5,623,601 A | 4/1997 | Vu |
| 5,625,404 A | 4/1997 | Grady et al. |
| 5,625,407 A | 4/1997 | Biggs et al. |
| 5,625,677 A | 4/1997 | Feiertag et al. |
| 5,625,682 A | 4/1997 | Gray et al. |
| 5,627,886 A | 5/1997 | Bowman |
| 5,627,971 A | 5/1997 | Miernik |
| 5,633,916 A | 5/1997 | Goldhagen et al. |
| 5,636,216 A | 6/1997 | Fox et al. |
| 5,640,387 A | 6/1997 | Takahashi et al. |
| 5,646,982 A | 7/1997 | Hogan et al. |
| 5,651,002 A | 7/1997 | Van Seters et al. |
| 5,651,006 A | 7/1997 | Fujino et al. |
| 5,652,787 A | 7/1997 | O'Kelly |
| 5,654,250 A | 8/1997 | VaDer Veer et al. |
| 5,654,957 A | 8/1997 | Koyama |
| 5,657,250 A | 8/1997 | Park et al. |
| 5,661,790 A | 8/1997 | Hsu |
| 5,661,791 A | 8/1997 | Parker |
| 5,661,792 A | 8/1997 | Akinpelu et al. |
| 5,668,857 A | 9/1997 | McHale |
| 5,673,263 A | 9/1997 | Basso et al. |
| 5,675,507 A | 10/1997 | Bobo, II |
| 5,675,741 A | 10/1997 | Aggarwal et al. |
| 5,680,392 A | 10/1997 | Semaan |
| 5,689,550 A | 11/1997 | Garson et al. |
| 5,689,553 A | 11/1997 | Ahuja et al. |
| 5,692,039 A | 11/1997 | Brankley et al. |
| 5,695,507 A | 12/1997 | Auth et al. |
| 5,699,089 A | 12/1997 | Murray |
| 5,699,352 A | 12/1997 | Kriete et al. |
| 5,701,295 A | 12/1997 | Bales et al. |
| 5,703,935 A | 12/1997 | Raissyan et al. |
| 5,703,942 A | 12/1997 | Pinard et al. |
| 5,708,697 A | 1/1998 | Fischer et al. |
| 5,710,884 A | 1/1998 | Dedrick |
| 5,712,903 A | 1/1998 | Bartholomew et al. |
| 5,712,906 A | 1/1998 | Grady et al. |
| 5,712,907 A | 1/1998 | Wegner et al. |
| 5,717,745 A | 2/1998 | Vijay et al. |
| 5,724,355 A | 3/1998 | Bruno et al. |
| 5,724,412 A | 3/1998 | Srinivasan |
| 5,726,984 A | 3/1998 | Kubler et al. |
| 5,727,129 A | 3/1998 | Barrett et al. |
| 5,729,544 A | 3/1998 | Lev et al. |
| 5,729,599 A | 3/1998 | Plomondon et al. |
| 5,732,078 A | 3/1998 | Arango |
| 5,737,320 A | 4/1998 | Madonna |
| 5,737,333 A | 4/1998 | Civanlar et al. |
| 5,737,395 A | 4/1998 | Irribarren |
| 5,737,525 A | 4/1998 | Picazo, Jr. et al. |
| 5,737,701 A | 4/1998 | Rosenthal et al. |
| 5,740,230 A | 4/1998 | Vaudreuil |
| 5,740,231 A | 4/1998 | Cohn et al. |
| 5,742,668 A | 4/1998 | Pepe et al. |
| 5,742,670 A | 4/1998 | Bennett |
| 5,742,674 A | 4/1998 | Jain et al. |
| 5,742,762 A | 4/1998 | Scholl et al. |
| 5,742,840 A | 4/1998 | Hansen et al. |
| 5,742,905 A | 4/1998 | Pepe et al. |
| 5,745,556 A | 4/1998 | Ronen |
| 5,745,702 A | 4/1998 | Morozumi |
| 5,749,075 A | 5/1998 | Toader et al. |
| 5,751,338 A | 5/1998 | Ludwig, Jr. |
| 5,751,706 A | 5/1998 | Land et al. |
| 5,751,791 A | 5/1998 | Chen et al. |
| 5,761,281 A | 6/1998 | Baum et al. |
| 5,764,644 A | 6/1998 | Miska et al. |
| 5,764,736 A | 6/1998 | Shachar et al. |
| 5,764,745 A | 6/1998 | Chan et al. |
| 5,764,756 A | 6/1998 | Onweller |
| 5,764,916 A | 6/1998 | Busey et al. |
| 5,768,513 A | 6/1998 | Kuthyar et al. |
| 5,768,527 A | 6/1998 | Zhu et al. |
| 5,774,660 A | 6/1998 | Brendel et al. |
| 5,781,620 A | 7/1998 | Montgomery et al. |
| 5,782,642 A | 7/1998 | Goren |
| 5,784,443 A | 7/1998 | Chapman et al. |
| 5,784,561 A | 7/1998 | Bruno et al. |
| 5,787,150 A | 7/1998 | Reiman et al. |
| 5,787,160 A | 7/1998 | Chaney et al. |
| 5,787,163 A | 7/1998 | Taylor et al. |
| 5,790,174 A | 8/1998 | Richard, III et al. |
| 5,790,548 A | 8/1998 | Sistanizadeh et al. |
| 5,790,554 A | 8/1998 | Pitcher et al. |
| 5,790,645 A | 8/1998 | Fawcett et al. |
| 5,790,798 A | 8/1998 | Beckett, II et al. |
| 5,793,498 A | 8/1998 | Scholl et al. |
| 5,799,016 A | 8/1998 | Onweller |
| 5,799,017 A | 8/1998 | Gupta et al. |
| 5,799,307 A | 8/1998 | Buitron |
| 5,802,283 A | 9/1998 | Grady et al. |
| 5,802,510 A | 9/1998 | Jones |
| 5,802,518 A | 9/1998 | Karaev et al. |
| 5,805,587 A | 9/1998 | Norris et al. |
| 5,805,700 A | 9/1998 | Nardone et al. |
| 5,809,110 A | 9/1998 | Ulrich et al. |
| 5,809,415 A | 9/1998 | Rossmann |
| 5,812,278 A | 9/1998 | Toyoda et al. |
| 5,812,640 A | 9/1998 | Chawla et al. |
| 5,812,654 A | 9/1998 | Anderson et al. |
| 5,813,006 A | 9/1998 | Polnerow et al. |
| 5,813,007 A | 9/1998 | Nielsen |
| 5,818,836 A | 10/1998 | DuVal |

(56) References Cited

U.S. PATENT DOCUMENTS

| | | | |
|---|---|---|---|
| 5,822,324 A | 10/1998 | Kostresti et al. | |
| 5,828,370 A | 10/1998 | Moeller et al. | |
| 5,828,837 A | 10/1998 | Eikeland | |
| 5,835,579 A | 11/1998 | Gersi et al. | |
| 5,835,720 A | 11/1998 | Nelson et al. | |
| 5,838,681 A | 11/1998 | Bonomi et al. | |
| 5,838,682 A | 11/1998 | Dekelbaum et al. | |
| 5,838,683 A | 11/1998 | Corley et al. | |
| 5,839,063 A | 11/1998 | Lee | |
| 5,842,224 A | 11/1998 | Fenner | |
| 5,844,600 A | 12/1998 | Kerr | |
| 5,844,972 A | 12/1998 | Jagadish et al. | |
| 5,848,143 A | 12/1998 | Andrews et al. | |
| 5,848,415 A | 12/1998 | Guck | |
| 5,850,385 A | 12/1998 | Esaki | |
| 5,850,388 A | 12/1998 | Anderson et al. | |
| 5,850,433 A | 12/1998 | Rondeau | |
| 5,850,442 A | 12/1998 | Muftic | |
| 5,850,518 A | 12/1998 | Northrup | |
| 5,854,893 A | 12/1998 | Ludwig et al. | |
| 5,854,899 A | 12/1998 | Calion et al. | |
| 5,854,985 A | 12/1998 | Sainton et al. | |
| 5,856,974 A | 1/1999 | Gervais et al. | |
| 5,859,967 A | 1/1999 | Kaufeld et al. | |
| 5,860,136 A | 1/1999 | Fenner | |
| 5,862,203 A | 1/1999 | Wulkan et al. | |
| 5,862,223 A | 1/1999 | Walker et al. | |
| 5,862,325 A | 1/1999 | Reed et al. | |
| 5,864,609 A | 1/1999 | Cross et al. | |
| 5,865,223 A | 2/1999 | Cornford | |
| 5,867,494 A | 2/1999 | Krishnaswarny et al. | |
| 5,867,495 A | 2/1999 | Elliott et al. | |
| 5,867,562 A | 2/1999 | Scherer | |
| 5,867,571 A | 2/1999 | Borchering | |
| 5,870,557 A | 2/1999 | Bellovin et al. | |
| 5,872,926 A | 2/1999 | Levac et al. | |
| 5,873,077 A | 2/1999 | Kanoh et al. | |
| 5,873,080 A | 2/1999 | Coden et al. | |
| 5,878,128 A | 3/1999 | Kantola | |
| 5,881,064 A | 3/1999 | Lin et al. | |
| 5,883,891 A | 3/1999 | Williams et al. | |
| 5,884,032 A | 3/1999 | Bateman et al. | |
| 5,884,262 A | 3/1999 | Wise et al. | |
| 5,889,848 A | 3/1999 | Cookson | |
| 5,892,764 A | 4/1999 | Riemann et al. | |
| 5,892,924 A | 4/1999 | Lyon et al. | |
| 5,903,558 A | 5/1999 | Jones et al. | |
| 5,905,736 A | 5/1999 | Ronen et al. | |
| 5,905,777 A | 5/1999 | Foladare et al. | |
| 5,905,862 A | 5/1999 | Hoekstra | |
| 5,905,871 A | 5/1999 | Buskens et al. | |
| 5,905,872 A | 5/1999 | DeSimone et al. | |
| 5,907,547 A | 5/1999 | Foladare et al. | |
| 5,907,602 A | 5/1999 | Peel et al. | |
| 5,907,607 A | 5/1999 | Waters et al. | |
| 5,915,008 A | 6/1999 | Dulman | |
| 5,923,659 A | 7/1999 | Curry et al. | |
| 5,931,961 A | 8/1999 | Ranganathan et al. | |
| 5,936,940 A | 8/1999 | Marin et al. | |
| 5,940,372 A | 8/1999 | Bertin et al. | |
| 5,940,479 A | 8/1999 | Guy et al. | |
| 5,940,598 A | 8/1999 | Strauss et al. | |
| 5,943,328 A * | 8/1999 | Hosford | 370/331 |
| 5,946,299 A | 8/1999 | Blonder | |
| 5,953,319 A | 9/1999 | Dutta et al. | |
| 5,953,350 A | 9/1999 | Higgins | |
| 5,959,996 A | 9/1999 | Byers | |
| 5,970,059 A | 10/1999 | Ahopelto et al. | |
| 5,970,477 A | 10/1999 | Roden | |
| 5,978,842 A | 11/1999 | Noble et al. | |
| 5,987,508 A | 11/1999 | Agrahararn et al. | |
| 5,991,810 A | 11/1999 | Shapiro et al. | |
| 5,991,817 A | 11/1999 | Rowett et al. | |
| 5,999,525 A | 12/1999 | Krishnaswarny et al. | |
| 5,999,956 A | 12/1999 | Deville | |
| 6,002,720 A | 12/1999 | Yurt et al. | |
| 6,003,030 A | 12/1999 | Kenner et al. | |
| 6,009,469 A | 12/1999 | Mattaway et al. | |
| 6,011,794 A | 1/2000 | Mordowitz et al. | |
| 6,011,804 A * | 1/2000 | Bertin et al. | 370/468 |
| 6,016,307 A | 1/2000 | Kaplan et al. | |
| 6,020,915 A | 2/2000 | Bruno et al. | |
| 6,031,904 A | 2/2000 | An et al. | |
| 6,034,946 A | 3/2000 | Roginsky et al. | |
| 6,064,653 A | 5/2000 | Farris | |
| 6,069,890 A | 5/2000 | White et al. | |
| 6,081,517 A | 6/2000 | Liu et al. | |
| 6,084,694 A | 7/2000 | Milton et al. | |
| 6,097,718 A | 8/2000 | Bion | |
| 6,104,720 A | 8/2000 | Kisor | |
| 6,134,235 A | 10/2000 | Goldman et al. | |
| 6,144,641 A | 11/2000 | Kaplan et al. | |
| 6,144,702 A | 11/2000 | Yurt et al. | |
| 6,154,744 A | 11/2000 | Kenner et al. | |
| 6,175,870 B1 | 1/2001 | Gawlick et al. | |
| 6,208,622 B1 * | 3/2001 | Makrucki | 370/252 |
| 6,208,658 B1 | 3/2001 | Pickett | |
| 6,212,192 B1 | 4/2001 | Mirashrafi et al. | |
| 6,288,738 B1 | 9/2001 | Dureau et al. | |
| 6,311,180 B1 | 10/2001 | Fogarty | |
| 6,314,093 B1 * | 11/2001 | Mann et al. | 370/351 |
| 6,327,251 B1 | 12/2001 | Bion | |
| 6,331,986 B1 | 12/2001 | Mitra et al. | |
| 6,335,927 B1 | 1/2002 | Elliott et al. | |
| 6,347,091 B1 | 2/2002 | Wallentin et al. | |
| 6,349,096 B1 | 2/2002 | Liu et al. | |
| 6,400,681 B1 | 6/2002 | Bertin et al. | |
| 6,456,594 B1 | 9/2002 | Kaplan et al. | |
| 6,473,404 B1 | 10/2002 | Kaplan et al. | |
| 6,542,468 B1 | 4/2003 | Hatakeyama | |
| 6,650,631 B1 | 11/2003 | Benash et al. | |
| 6,788,646 B1 * | 9/2004 | Fodor et al. | 370/230 |
| 6,912,232 B1 | 6/2005 | Duffield et al. | |
| 7,307,956 B2 | 12/2007 | Kaplan et al. | |
| 7,561,517 B2 * | 7/2009 | Klinker et al. | 370/235 |
| 8,400,926 B2 | 3/2013 | Kaplan et al. | |
| 2002/0028656 A1 * | 3/2002 | Yemini et al. | 455/41 |

FOREIGN PATENT DOCUMENTS

| | | |
|---|---|---|
| EP | 0274793 A1 | 7/1988 |
| EP | 0373228 B1 | 6/1990 |
| EP | 0418813 A2 | 3/1991 |
| EP | 0483547 A1 | 5/1992 |
| EP | 0488706 | 6/1992 |
| EP | 0599764 A1 | 6/1994 |
| EP | 0631457 A3 | 12/1994 |
| EP | 0641133 A2 | 3/1995 |
| EP | 0647051 A1 | 4/1995 |
| EP | 0649265 A1 | 4/1995 |
| EP | 0651548 A1 | 5/1995 |
| EP | 0668681 A2 | 8/1995 |
| EP | 0669736 A2 | 8/1995 |
| EP | 0669737 A2 | 8/1995 |
| EP | 0674459 A2 | 9/1995 |
| EP | 0675449 A1 | 10/1995 |
| EP | 0687124 A3 | 12/1995 |
| EP | 0715443 A2 | 6/1996 |
| EP | 0720396 A2 | 7/1996 |
| EP | 0767568 A2 | 4/1997 |
| EP | 0781016 A2 | 6/1997 |
| EP | 0783217 A2 | 7/1997 |
| EP | 0785697 A2 | 7/1997 |
| EP | 0785698 A2 | 7/1997 |
| EP | 0785699 A2 | 7/1997 |
| EP | 0802690 A1 | 10/1997 |
| EP | 0809410 A2 | 11/1997 |
| EP | 0849916 A2 | 6/1998 |
| JP | 60-177761 | 9/1985 |
| JP | H04263548 | 9/1992 |
| JP | H05316248 | 11/1993 |
| JP | 9-168051 | 6/1997 |
| JP | 9-168063 | 6/1997 |
| JP | 9-168064 | 6/1997 |

(56) References Cited

FOREIGN PATENT DOCUMENTS

| | | |
|---|---|---|
| JP | 9-168065 | 6/1997 |
| JP | 9-172459 | 6/1997 |
| JP | 9-172462 | 6/1997 |
| WO | WO 88/07298 | 9/1988 |
| WO | WO 91/07839 | 5/1991 |
| WO | WO 92/13406 | 8/1992 |
| WO | WO 93/09624 | 5/1993 |
| WO | WO 95/11574 | 4/1995 |
| WO | WO 95/17077 | 6/1995 |
| WO | WO 95/22221 | 8/1995 |
| WO | WO 95/26091 | 9/1995 |
| WO | WO 95/32588 | 11/1995 |
| WO | WO 95/34972 | 12/1995 |
| WO | WO 96/17457 | 6/1996 |
| WO | WO 96/20553 | 7/1996 |
| WO | WO 96/28947 | 9/1996 |
| WO | WO 96/29805 | 9/1996 |
| WO | WO 96/32800 | 10/1996 |
| WO | WO 96/34341 | 10/1996 |
| WO | WO 96/34479 | 10/1996 |
| WO | WO 96/38018 | 11/1996 |
| WO | WO 97/07637 | 2/1997 |
| WO | WO 97/09218 | 3/1997 |
| WO | WO 97/11553 | 3/1997 |
| WO | WO 97/14238 | 4/1997 |
| WO | WO 97/19411 | 5/1997 |
| WO | WO 97/21313 | 6/1997 |
| WO | WO 97/22211 | 6/1997 |
| WO | WO 97/23078 | 6/1997 |
| WO | WO 97/28628 | 8/1997 |
| WO | WO 97/32448 | 9/1997 |
| WO | WO 97/33412 | 9/1997 |
| WO | WO 97/34394 | 9/1997 |
| WO | WO 97/48197 | 12/1997 |
| WO | WO 98/04092 | 1/1998 |
| WO | WO 98/09456 | 3/1998 |
| WO | WO 98/12860 | 3/1998 |
| WO | WO 98/23080 | 5/1998 |
| WO | WO 98/26530 | 6/1998 |
| WO | WO 98/27754 | 6/1998 |
| WO | WO 98/34391 | 8/1998 |

OTHER PUBLICATIONS

IPX System Operations Guide by Stratacom, (1998), pp. 1-1-1-2, 2-5-2-8, and 2-13-2-16, PCT International Search Report dated Jul. 10, 1992.

T. E. Tedijanto et al, NBBS Path Selection Framework, 8204 IBM Systems Journal 34 (1995) Fall, No. 4, Armonk, NY, p. 629-639.

The Phone Zone—Comparative Analysis of PC Based PBX Systems, http://www.phonezone.com/phone-compare-htm, Oct. 1, 1996.

Signalling System No. 7, http://www.datakinetics.co.uk/ss7,htrn, Oct. 30, 1997.

Access the Intellingent Network, ttp://www.gteins/net.overview.htrn, Oct. 30, 1997.

Gerla, Mario and Kleinrock, Leonard, "Flow Control: A Comparative Survey"; IEEE Transactions on Communications, vol. Com-28, No. 4, Apr. 1980, pp. 553-574.

Majithia, J.C., Irland, M., Grange, J.L., Cohen, N., O'Donnell, C.; "Experiments in Congestion Contro Techniques", Flow Control in Computer Networks (1979), pp. 211-234.

Turner, Jonathan S., New Directions in Communications (or Which Way to the Information Age?), IEEE Communications Magazine, vol. 24, No. 10, Oct. 1986, pp. 8-15.

Services Digital Network (ISDN)—Signaling Specification for Frame Relay Bearer Service for Digital Subscriber Signaling System No. 1 (DSS1) (Protocol encapsulation and PICS). Approved Jan. 20, 1994.

American National Standard for Telecommunications, "Integrated Services Digital Network (ISDN)—Architectural Framework and Service Description for Frame-Relaying Bearer Service (Congestion Management and Frame Size)." Approved Apr. 29, 1992, pp. 1-12.

American National Standard for Telecommunications, "Integrated Services Digital Network (ISDN)—Signaling Specification for Frame Relay Bearer Service for Digital Subscriber Signaling System No. 1 (DSS1)." Approved Oct. 24, 1991.

ATM Forum: Technical Committee ATM. "ATM Data Exchange Interface (DXI) Specification." Aug. 1993.

Case, J.D., J.R. Davins, M.S. Fedor, and M.L. Schoffstall, "Introduction to the Simple Gateway Monitoring Protocol." IEEE Network, vol. 2, No. 2, Mar. 1988.

Chapman, John T. and M. Halabi, "High Speed Serial Interface (HSSI) Design Specification." Cisco Systems and T3 Plus Networking, Inc. Revision 3.0, Apr. 12, 1993.

Garcia-Luna-Aceves, J.J., "Loop-Free Routing Using Diffusing Computations." IEEE/ACM Transaction on Networking. vol. 1, No. 1, 1993.

Ross, F.E., "FDDI-A Tutorial." IEEE Communications Magazine, vol. 24, No. 5: May 1986.

Zimmerman, H., "OSI Reference Model—The ISO Model of Architecture for Open Systems Interconnection." IEEE Transactions on Communications COM-28, No. 4: Apr. 1980.

Patent Cooperation Treaty's International Application Publication No. WO 96/38018, published Nov. 28, 1996, 26 pgs.

C. Yang, RFD 1789 INET:Telephone Services and servers on Internet, http://ds.internic.net/rfc/rfc1789txtxt, pp. 1-6.

Cerf, V., et al. "A Protocol for Packet Network Intercommunication", IEEE Transactions on Communication, May 5, 1974, pp. 637-648, vol. Com 22, No. 5.

Weinstein, C. et al., "Experience with Speech Communication in Packet Networks", IEEE Journal on Selected Areas in Communications, Dec. 1983, pp. 1-18, vol. SAC-1., No. 6.

Baran, P., "On Distributed Communications Networks.", IEEE Transactions Communication Systems, manuscript received Oct. 1963, Mar. 1964.

Aras.C., et al., "Real-Time Communication in Packet-Switched Networks.", Proceedings of the IEEE, Jan. 1994, pp. 122-139, vol. 82, No. 1.

Hapgood, Fred., "Dialing without Dollars", Journal Code:INO, Jul. 1995, p. 8., vol. 17, No. 4.

"Internet phone calls are cheap but limited", New Media Markets, Newsletter, Feb. 23, 1995.

Internet's international phone calls are cheap but limited:, Telecom markets, Newsletter, Mar. 2, 1995.

"Internet phone saves 50% on long distance", 411 Newsletter, Aug. 5, 1996, vol. 17, No. 15.

"Internet access: Internet phone-to-phone technology now reality . . . ", EDGE publishing, Aug. 12, 1996.

"Internet telephony seems to be evolving fast . . . ", Computergram International, Aug. 19, 1996, No. 2980.

"Competition heats up in Internet phone call wars", Newbytes New network, Jun. 2, 1995.

"Vocal Tec Telephony Gateway", posted on the Internet, viewed on Jan. 15, 1997.

"Netspeak corporation introduces WebPhone, . . . ", Internet, Mar. 18, 1996.

"Phone Service Via the Internet May Slash Rates", The Washington Post, by Mike Mills, Aug. 11, 1996, pp. 1-4.

Clifford et al., "Experience with Speech Communication in Packet Networks", IEEE, 1983, p. 963-978.

"Policy-Based Routing", Internet white paper, http:/www-.cisco.com/warp/public/732/Tech/plicy_wp.htm, posted Sep. 12, 1996.

Jan. 1, 1990 An Analysis of "Hot-Potato" Routing in a Fiber Optic Packet Switched Hypercube Ted Szymanski 918-925. Jan. 1, 1998 Ascend White Paper: Ascend MultiVoice Architecture Strategy From Dial-Tone to Data Tone Ascend Communications, Inc 1-15.

Sep. 1, 1998 Ascend White Paper: The Next Generation Public Network: Opportunities for CLECs and ISPs Gary Kim 1-48.

Jul. 1, 1997 White Paper: The Case for IPv6 Bay Networks 2-35.

Jan. 1, 1999 The Succession Network (http://www.nortel-networks.com) Nortel Networks.

May 14, 1995 IP Next Generation Overview (http://play-ground.sun.com/pub/ipng/html/INET-Ipng-Paper.html) Robert M. Hinden 1-21.

Jan. 1, 1995 The Recommendation for the IP Next Generation Protocol (http://www.ietf.org/frc/frc1752.txt) Bradner & Mankin 1-49.

(56) References Cited

OTHER PUBLICATIONS

"The Phone Zone—Comparative Analysis of PC Based PBX Systems", http://www.phonezone.com/phonecompare-htm, Oct. 1, 1996.

"Signalling System No. 7", http://www.datakinetics.co.uk/ss7.htm, Oct. 30, 1997.

"Access the Intelligent Netowork", http://www.gteins/net/overview.htm, Oct. 30, 1997.

"Using the Border Gateway Protocol for Interdomain Routing", http://www.cisco.com/univercd/cc/td/doc/cisintwk/ics/icsbgp4.htm, Sep. 10, 1998.

Aidarous et al., "The Role of the Element Management Layer in Network Management", 1994 IEEE Network Operations and Management Symposium, Feb. 1994, pp. 59-69.

Bethoney, Herb "HAHTSite Gives Pros Everything They Need", PC Week, Mar. 10, 1997, pp. 36-37.

Bohn, Roger et al., "Mitigating the Coming Internet Crunch: Multiple Service Levels via Precedence", Journal of High Speed Network, vol. 3, No. 4, 1994, pp. 335-349.

Braun, Torsten et al., "Implementation of an Internet Video Conferencing Application Over ATM"?, 1997 IEEE, pp. 287-294.

Chen, Larry et al., "ATM and Satellite Distribution of Multimedia Educational Courseware", 1995 International Conference on Communications, Jun. 1995, pp. 1133-1137.

Civanlar, M. Reha et al., "FusionNet: Joining the Internet & Phone Networks for Multimedia Applications", ACM Multimedia 96, pp. 431-432.

Cobbold, Christopher et al., "Enhancement for Integrated Wireless Personal Communications Over Metropolitan Area Networks", 1996 IEEE International Conference on Communications, Jun. 1996, pp. 1370-1376.

Comer, Douglas, "Internetworking with TCP/IP vol. I: Principles, Protocols, and Architecture", Third Ed., Prentice Hall, 1995, pp. 143-153.

Diehl, Standford, "Data's New Voice", BYTE, Sep. 1996, pp. 129-135.

Duan, Juan et al., "Efficient Utilization of Multiple Channels Between Two Switches in ATM Networks", Department of Computer Science—University of South Carolina, Feb. 1995, pp. 1906-1911.

Ejiri, Masayoshi, "For Whom the Advancing Service/Net-work Management", 1996 IEEE International Conference on Communications, Jun. 1996, pp. 422-433.

Elia, Carlo et al., "Skyplex: Distribution Up-Link for Digital Television Via Satellite", Dec. 1996, pp. 305-313.

Ely, Tom, "The Service Control Point as a Cross Network Integrator", IEEE Intelligent Network Workshop in 96, Apr. 1996, pp. 1-8.

Eriksson, Hans, "MBONE: The Multicase Backbone", Communications of the ACM, vol. 57, No. 8, Aug. 1994, pp. 54-60.

Feinmann, "VIC Computer Telephony", Computer Telephony, Mar. 1996, pp. 219-221.

Fridisch, M. et al., "Terminals for Accessing the Internet—The Internet Telephone", Alcatel Telecommunications Review—4'h Quarter 1996, pp. 304-309.

Ganor, Elan, "Talk Talk", Tele.com, Jun. 1996, pp. 68-72.

Gareiss, Robin, "Voice Over the Internet", Data Communications, vol. 25, No. 12, Sep. 1996, pp. 93, 94, 96, 98, 100.

Gralla, Preston: "How the Internet Works", 1996 by Macmillan Computer Publishing USA; Part 3 Communicating on the Internet, Chapter 12 "Making Phone Calls on the Internet", pp. 64-67; Part 5 Multimedia on the Internet, Chapter 19 "Video on the Internet", pp. 104-111.

Gralla, Preston, Part 4 Communicating on the Internet, "How to Make Phone Calls Using Your PC and the Internet", pp. 118-119.

Grami et al., "The Role of Satellites in the Information Superhighway", 1994 IEEE Network Operations and Management Symposium, Feb. 1994, pp. 1577-1581.

Gupta et al., "Technical Assessment of (T) INA-TMN-OSI Technology for Service Management Applications", IEEE Intelligent Network Workshop, Apr. 1996, pp. 877-887.

Gys, L. et al., "Intelligence in the Network", Alcatel Tele-communications Review—1st Quarter 1998, pp. 13-22.

Hurwicz, Michael, "Faster Smarter Nets". Apr. 1997, pp. 83-89.

Inamori et al., "Applying TMN to a Distributed Communications Node System with Common Platform Software", Feb. 1995, pp. 83-87.

Jain, Surinder, "Evolving Existing Narrowband Networks Broadband Networks with IN Capabilities", Apr. 22, 1996. Kahn, Jeffery, "Videoconferencing Debuts on the Internet", Feb. 28, 1995.

Kelly, Katy, "Mountaintop Office Keeps Skiers in Touch", USA Today, vol. 15, No. 112.

Kim, Gary, "Talk is Cheap", America's Network, Jul. 15, 1996, pp. 34-39.

Kishimoto, Ryozo, "Agent Communication System for Multimedia Communication Services", 1995 IEEE International Conference on Communications, pp. 10-17.

Kolarov et al., "End-to-End Adaptive Rate Based Congestion Control Scheme for ABR Service in Wide Area ATM Networks", IEEE INFOCOM, Mar. 1996, pp. 138-143.

Kumar, Vinay, "Internet Multicasting: Internet's Next Big Thing", ICAST Corp. 1997.

Lapolla, Stephanie, PC Week, "Net Call Centers, Voice to Merge", Mar. 31, 1997, p. 10.

Li, Chung-Sheng et al., "Time-Driven Priority Flow Control for Real-Time Heterogeneous Internetworking", Proceedings in Computer Communications, Fifteenth Annual Joint Conference of the IEEE Computer and Communication Generation, San Francisco, Mar. 24-28, 1996, vol. 1, Conf., Mar. 24, 1996, IEEE, pp. 189-197.

Louth, Nick, Reuters, "MCI Communications Corp Vaults Phone-Data Divide", MCI Communications Corp. New Page, Jan. 29, 1997, web page attached.

Low, Colin, et al., "WebiN—An Architecture for Fast Development of IN-Based Personal Services", Workshop Record Intelligent Network.

Freedom and Flexibility: Realizing the Promise of Intelligent Network Services, Apr. 21, 1996, pp. 1-12.

Macedonia, Michael et al., "MBone Provides Audio and Video Across the Internet", Apr. 1994, pp. 30-36.

Margulies, Ed, "CT' Cyberdate with the Net", Computer Telephony Periscope, Aug. 1996, pp. 28-29.

Matta, 1., et al., Type-of-Service Routing in Dynamic Datagram Networks, Proceedings of the Conference on Computer Communications IEEE, Issue 3, 1994, pp. 992-999.

Miller, Mark, "Troubleshooting TCP/IP", Managing the Internet, Chapter 7, 1992, pp. 365-389.

Newton, Harry, "The Personal Side of CT", Computer Telephony, Jan. 1997.

Oppen, et al.: "The Clearinghouse: A Decentralized Agent for Locating Named Objects in a Distributed Environment" ACM Transactions on Office Information Systems, vol. 1, No. 3, Jul. 1983, pp. 230-253.

Peeren, Rene, "The Intelligent Web", IEEE Intelligent Network Workshop, Apr. 1996, vol. 1.

Perret et al., "MAP: Mobile Assistant Programming for Large Scale Communications Networks", 1995 IEEE International Conference on Communications, Jun. 1995, pp. 1128-1132.

Pezzutti, David, "Operations Issued for Advanced Intelligent Networks", IEEE Communications Magazine, Feb. 1992, pp. 58-63.

Platt, Richard, "Why IsoEthernet Will Change the Voice and Video Worlds", IEEE Communications Magazine, Apr. 1996, pp. 55-59.

Retkwa, Rosalyn, "Telephone Politics", Internet World, Jun. 1996, pp. 54-60.

Schreyer, Oliver et al., "Least Cost Call Routing—A Brilliant Application for Private IN", Apr. 1996, pp. 12-17.

Schulzrinne, Henning, "RTP: A Transport Protocol for Real-Time Applications", Jan. 1996.

Schulzrinne, Henning, "RTP: Profile for Audio and Video Conference with Minimal Control", Jan. 1996.

Sclavos, Jean et al., "Information Model: From Abstraction to Application", 1995 IEEE International Conference on Communications, Jun. 1995, pp. 183-195.

Serrano, Inma R., "Evolution of Hybrid Fibre Coaxial Network for Multi-media Interactive Services", British Telecommunications Engineering, Oct. 1996, pp. 249-253.

(56) References Cited

OTHER PUBLICATIONS

Sharp, C.D. and K. Clegg, "Advanced Intelligent Net-works—Now a Reality", Electronics & Communication Engineering Journal, Jun. 1994, pp. 153-162.
Sullivan, K.B., "Videoconferencing Arrives on the Internet", Aug. 1996.
Sunaga et al., "A Reliable Communication Switching Platform for Quick Provisioning," IEEE International Conference on Communications, Jun. 1996, pp. 77-82.
The Wall Street Journal, "MCI's New Service for Corporate Use Sets 1 Line for Net, Phone", Jan. 30, 1997, web page attached.
Tsuchida et al., "Intelligent Dynamic Service Provisioning Architecture in the Multimedia Era", 1995 IEEE International Conference on Communications, Jun. 1995, pp. 1117-1122.
Williebeek-Lemair, Marc. H. & Zon-Yin Shae, "Video-conferencing Over Packet-Based Networks", IEEE Journal on Selected Areas in Communications, vol. 15, No. 6, Aug. 1997, pp. 1101-1114.
Yang, C., University of North Texas, Apr. 1995, "NET-Phone: Telephone Services and Servers on the Internet" Network Working Group; Request for Comments: 1789; Category: Informational.
Yeager, Nancy & McGrath, Robert, "Web Server Technology, the Advanced Guide for World Wide Web Information Provides" Chapter 6: Searching for Information on the Web, 6.8.2 Using Databases as Indexes to a Document Collection, p. 250.
"Net Telephony Spec Recommended", Communications Week, Mar. 19, 1997, p. 12. "Internet by Satellite", QuickLook.
"Telephony on the Internet" (Workshop Information) presented by International Quality & Productivity Center, IMTC, and VOICE Technology & Services News, Sep. 26, 1996.
Black, V. "OSI" A Model for Computer Communications Standards, Prentice-Hall, Inc., pp. 162-163, 1991.
Sriram, Kotikalapudi et al., "Voice Packerization and Compression in Broadband ATM Networks", Apr. 1991, IEEE Journal on Selected Areas in Communications, vol. 9, No. 3, pp. 294.304.
Patent Cooperation Treaty's International Search Report for International application No. PCT/SE 96/00680, dated Sep. 20, 1996, 2 pgs.
"Genesys Telecommunications' net.Vectorin United Inter-net, Advanced Call center Capabilities, and Two-Way Real-time Video Conferencing," http://www.genesyslab.com/ge-nesys/press/archived/ainn.html, Genesys Publications, Dec. 13, 1995 and Jan. 10, 1996.
"IDT Release Net2Phone Commerical Version Three Months Ahead of Schedule," IDT Press Release, http://www.idt.net/8-5-96.htnl, pp. 1-3, Aug. 5, 1996.
"SoundXchange interACTIVE," SoundXchange, http://ww-w.iact.com, pp. 1-5, Aug. 9, 1996.
"Internet Telephones," PC Magazine, pp. 107, 108, 110, 114, 117, 118, 119, 120; Oct. 8, 1996.
Hill, Jon "Net2Phone Makes the Call," PC Magazine, p. 58, Oct. 22, 1996.
"IDT Unveils Full-Duplex Version of Net2Phone." IDT Press Release, http://www.idt.net/11-21-96.htmi, pp. 1-2, Nov. 21, 1996.
Abstract, "SET: Bellcore Specification of Signaling system No. 7 (SS7)," http://www.bellcore.com, p. I 1996.
Abstract, "Bellcore Specification of Signaling System No. 7 (SS7)," http://www.bellcore.com, pp. 1-2, 1996.
"Atlas Telecom Delivers New Enhanced Services Platform Based on Natural MicroSystems Open Telecommunications Technology," http://www.nmss.com/nmsweb/288a 131f6.html, Nov. 5, 1996.
Telephony Services Architecture: "Natural Platforms" http://www.nmss.com/nmsweb/2486_le6o.html, 1996.
Natural Platforms: AG-TI Datasheet "24 Ports of Voice Processing, an Integrated TI Interface, and Natural Media Options,"http://www.nmss.com/nmsweb/22b6_lc6.html, 1996.
"Frequently Asked Questions—Technical Support FAQ's," What is Net2Phone, http://www.net2phone.com/tech- faq.html, pp. 2-8.
Net2Phone Info, http://www.net2phone.com/ninfo.html, p. 1, printed Dec. 17, 1996.
"Welcome to the Vicinty Corporation Home Page," http://www.vicinity.com, pp. 2-3, 1996.

"Microlegend SS7 Tutorial:The SS7 Protocol Stack," http://www.microlegend.com/stack.html, pp. 1-2, last update May 23, 1997.
Microlegend SS7 Tutorial: Signaling Connection Control Part, http://www.microlegend.com/sccp.html, p. 1, last update May 23, 1997.
"Microlegend SS7 Tutorial: Transaction Capabilities Application Part", http://www.microlegend.com/tcap.html, pp. 1-2, 1st update May 23, 1997.
"Microlegend SS7 Tutorial: What is SS7?", http://www.microlegend.com/whatss7.html, pp. 1-3 last update May 25, 1997.
"Microlegend SS7 Tutorial: Message Transfer Part", http://www.microlegend.com/mtp.html, pp. 1-5, update Jun. 9, 1997.
"Microlegend SS7 Tutorial: ISDN User Part", http://www.microlegend.com/isup.html, pp. 1-3, last update Jun. 10, 1997.
Telephony Gateway White Paper, "VocalTec Telephony Gateway," http://www.vocaltec.com, pp. 2-9; © 1993-1996. Apple Computer, Inc. AppleTalk Network System Overview. Reading, Massachusetts: Addison-Wesley Publishing Company, Inc.; 1989.
Apple Computer, Inc. Planning and Managing AppleTalk Networks. Reading, Massachusetts: Addison-Wesley Publishing Company, Inc.; 1991.
Black, U. Data Networks: Concepts, Theory and Practice. Englewood Cliffs, New Jersey: Prentice Hall; 1989.
Black, U. Physical Level Interfaces and Protocols. Los Alamitos, California: IEEE Computer Society Press; 1988. Case, J.D., J.R. Davins, M.S. Fedor, and M.L. Schoffstall.
"Network Management and the Design of SNMP." ConneXions: The Interoperability Report, vol. 3: Mar. 1989.
Clark, W. "SNAinternetworking" ConneXions: The Interoperability Report, vol. 6, No. 3: Mar. 1992.
Coltun, R. "OSPF: An Internet Routing Protocol," ConneXions: The Interoperability Report, vol. 3, No. 8: Aug. 1989.
Comer, D.E. Interworking with TCP/IP:Principles, Proto-cols, and Architectures, vol. I, 2nd ed. Englewood Cliffs, New Jersey: Prentice Hall; 1991.
Davidson, J. An Introduction to TCP/IP. New York, New York: Springer-Verlag; 1992.
Ferrari, D. Computer Systems Performance Evaluation. Englewood Cliffs, New Jersey: Prentice Hall; 1978.
Green, J.K. Telecommunications, 2nd ed. Homewood, Illinois: Business One Irwin; 1992.
Hagans, R. "Components of OSI: ES-IS Routing." ConneXions: The Interoperability Report, vol. 3, No. 8: Aug. 1989. Hares, S.
"Components of OSI: Inter-Domain Routing Protocol (IDRP).P". ConneXions: The Interoperability Report, vol. 6, No. 5: May 1992.
Jones, N.E.H. and D. Kosiur. Macworld Networking Handbook. San Mateo, California: IDG Books Worldwide, Inc.; 1992.
Joyce, S.T. and J.Q. Walker II. "Advanced Peer-to-Peer Networking (APPN): An Overview." ConneXions: The Interoperabiltiy Report, vol. 6, No. 10: Oct. 1992.
Kousky, K. "Bridging the Networking Gap." LAN Technology, vol. 6, No. 1: Jan. 1990.
LaQuey, Tracy. The Internet Companion: A Beginner's Guide to Global Networking. Reading, Massachusetts: Addison-Wesley Publishing Company, Inc.; 1994.
Leinwoand, A. and K. Fang. Network Management: A Practical Perspective. Reading, Massachusetts: Addison-Wesley Publishing Company, Inc.; 1993.
Lippis, N. "The Internetwork Decade." Data Communications, vol. 20, No. 14: Oct. 1991.
McNamara, J.E. Local Area Networks. Digital Press, Educational Services, Digital Equipment Corporation, 12 Crosby Drive, Bedford, MA 01730.
Malamud, C. Analyzing DECnet/OSI Phase V. New York, New York: Van Nostrand Reinhold; 1991.
Malamud, C. Analyzing Novell Networks. New York, New York: Van Nostrand Reinhold; 1991.
Malamud, C. Analyzing Sun Networks. New York, New York: Van Nostrand Reinhold; 1991.
Martin, J. SNA: IBM's Networking Solution. Englewood Cliffs, New Jersey: Prentice Hall; 1987.
Martin, J. with K.K. Chapman and the ARBEN Group, Inc. Local Area Networks, Architectures and Implementations. Englewood Cliffs, New Jersey: Prentice Hall; 1989.

(56) References Cited

OTHER PUBLICATIONS

Medin, M. "The Great IGP Debate—Part Two: The Open Shortest Path First (OSPF) Routing Protocol." ConneXions: The Interoperability Report, vol. 5, No. 10: Oct. 1991.
Meijer, A Systems Network Architecture: A Tutorial. New York, New York: John Wiley & Sons, Inc.; 1987.
Miller, M.A. LAN Protocol Handbook. San Mateo, California: M&T Books; 1990.
Miller, M.A. LAN Troubleshooting Handbook. San Mateo, California: M&T Books; 1989.
O'Reilly, T. and G. Todino. Managing UUCP and Usenet, 10'h ed. Sebastopol, California: O'Reilly & Associates, Inc.; 1992.
Perlman, R. Interconnections: Bridges and Routers. Reading, Massachusetts: Addison-Wesley Publishing Company, Inc.; 1992.
Perlman, R. and R. Callan. "The Great IGP Debate—Part One: IS-IS and Integrated Routing." ConneXions: The Interoperability vol. 5, No. 10: Oct. 1991.
Rose, M.T. The Open Book: A Practical Perspective on OSI. Englewood Cliffs, New Jersey: Prentice Hall; 1990.
Rose, M.T. The Simple Book: An Introduction to Management of TCP/IP-based Internets. Englewood Cliffs, New Jersey: Prentice Hall; 1991.
Schlar, S.K. Inside X.25: A Manager's Guide. New York, New York: McGraw-Hill, Inc.; 1990.
Schwartz, M. Telecommunications Networks: Protocols, Modeling, and Anaylsis. Reading, Massachusetts: Addison-Wesley Publishing Company, Inc.; 1987.
Sherman, K., Data Communications: A User's Guide. Englewood Cliffs, New Jersey: Prentice Hall; 1990.
Sidhu, G.S., R.F. Andrews, and A.B. Oppenheimer. Inside AppleTalk, 2nd ed. Reading, Massachusetts: Addison-Wesley Publishing Company, Inc.; 1990.
Spragins, J.D. et al. Telecommunications Protocols and Design. Reading, Massachusetts: Addison-Wesley Publishing Company, Inc.; 1991.
Stallings, W. Data and Computer Communications. New York, New York: Macmillan Publishing Company; 1991.
Stallings, W. Handbook of Computer—Communications Standards, vol. 1-3. Carmel, Indiana: Howard W. Sams, Inc.; 1990.
Stallings, W. Local Networks, 3rd ed. New York, New York: Macmillan Publishing Company; 1990.
Sunshine, C.A. (ed.). Computer Network Architectures and Protocols, 2nd ed. New York, New York: Plenum Press; 1989.
Tannenbaum, A.S. Computer Networks, 2nd ed. Englewood Cliffs, New Jersey: Prentice Hall; 1988.
Terplan, K. Communication Networks Management. Englewood Cliffs, New Jersey: Prentice Hall; 1992.
Tsuchiya, P. "Components of OSI: IS-IS Intra-Domain Routing." ConneXions: The Interoperability Report, vol. 3, No. 8: Aug. 1989.
Tsuchiya, P. "Components of OSI: Routing (An Overview)." ConneXions: The Interoperability Report, vol. 3, No. 8: Aug. 1989.
Advanced Micro Devices. The Supernet Family for FDDI. Technical Manual No. 09779A.
Advanced Micro Devices. The Supernet Family for FDDI. 1989 Data Book No. 09734C.
American National Standards Institute X3T9.5 Committee. FDDI Station Management (SMT) Rev. 6.1; Mar. 15, 1990.
American National Standards Institute. Revised Text of ISO/DIS 8802/2 for the Second DIS Ballot, "Information Processing System—Local Area Networks." Part 2: Logical Link Control. Jan. 14, 1987.
Banyan Systems, Inc., VINES Protocol Definition, DA254-00, Rev. 1.0. Westboro, Massachusetts; Feb. 1990.
Bellcore. Generic System Requirements in Support of a Switched Multi-Megabit Data Service. Technical Advisory, TA-TSY-000772; Oct. 1989.
Bellcore. Local Access System Generic Requirements, Objectives, and Interface Support of Switched Multi-Mega-bit Data System. Technical Advisory TA-TSY-000773, Issue 1; Dec. 1985.
Bellcore. Switched Multi-Megabit Data Service (SMDS) Operations Technology Network Element Generic Requirements. Technical Advisory, TA-TSY-000774.
Consultative Committee for International Telegraph and Telephone. CCITT Data Communications Networks—Services and Facilities, Terminal Equipment and Interfaces, Recommendations X.I-X.29. Yellow Book, vol. VIII, Fas-cicle VII1.2; 1980.
Consultative Committee for International Telegraph and Telephone. CCITT Data Communications Networks-Inter-faces, Recommendations X.20-X.3.2. Red Book, vol. VIII, Fascicle VIII.3; 1984.
DDN Protocol Handbook. Four vol. 1989.
Defense Communications Agency. Defense Data Network X.25 Host Interface Specification. Order No. AD A137 427; Dec. 1983.
Digital Equipment Corporation. DECnet/OSI Phase V.• Making the Transition from Phase N. EK-PVTRN-BR; 1989.
Digital Equipment Corporation DEC server 200 Local Area Transport (LAT) Network Concepts. AA-LD84A-TK; Jun. 1988.
Digital Equipment Corporation. Digital Network Architecture (Phase V). EK-DNAPV-GD-001; Sep. 1987.
Digital Equipment Corporation. Intel Corporation, Xerox Corporation.
The Ethernet, A Local-Area Network, Data Link Layer and Physical Layer Specification. Ver. 2.0; Nov. 1982.
Feinler, E.J., et al. DDN Protocol Handbook, vols. 1-4, NIC 50004, 50005m 50006, 50007. Defense Communications Agency. Alexandria, Virginia; Dec. 1985.
Garcia-Luna-Aceves, J.J. "A Unified Approach to Loop-Free Routing Using Distance Vectors or Link States." ACM 08979-332-9/89/ 0009/0212, pp. 212-223; Sep. 1989.
Hemrick, C. and L. Lang. "Introduction to Switched Mul-ti-megabit Data Service (SMDS), an Early Broadband Service," Proceedings of the XIII International Switching Symposium (ISS 90), May 27-Jun. 1, 1990.
Hewlett-Packard Company. X.25: The PSN Connection: An Explanation of Recommendation X.25. 5958-3402: Oct. 1985.
IEEE 802.2—Local Area Networks Standard, 802.2 Logical Link Control. ANSI/IEEE Standard; Oct. 1985.
IEEE 802.3—Local Area Networks Standard, 802.3 Carrier Sense Multiple Access. ANSI/IEEE Standard; Oct. 1985.
IEEE 802.5—Local Area Networks Standard, 802.5 Token Ring Access Method. ANSI/IEEE Standard; Oct. 1985.
IEEE 802.6—Local & Metropolitan Area Networks Standard, 802.6 Distributed Queue Dual Bus (DQDB) Subnet—work of a Metropolitan Area Network (MAN). ANSI/IEEE Standard; Dec. 1990.
International Business Machines Corporation.ACF/NCP/VS network control program, system support programs: general information. GC30-3058.
International Business Machines Corporation. Advanced Communications Function for VTAM (ACF/VTAM), general information: introduction. GS27-0462.
International Business Machines Corporation. Advanced Communications Function for VTAM, general information: concepts. GS27-0463.
International Business Machines Corporation. Dictionary of Computing. SC20-1699-7; 1987.
International Business Machines Corporation. Local Area Network Technical Reference. SC30-3883.
International Business Machines Corporation. Network Problem Determination Application: general information. GC34-2010.
International Business Machines Corporation. Synchronous Data Link Control: general information. GA27-3093.
International Business Machines Corporation. Systems Network Architecture: concepts and products. GC30-3072.
International Business Machines Corporation. Systems Net-work Architecture: technical overview. GC30-3073-1; 1985.
International Business Machines Corporation. Token-Ring Network Architecture Reference. SC30-3374.
International Business Machines Corporation. Token-Ring Problem Determination Guide. SX27-3710-04; 1990.
International Organization for Standardization. Information Processing System—Open System Interconnection; Specification of Abstract Syntax Notation One (ASN.I). International Standard 8824; Dec. 1987.

(56) References Cited

OTHER PUBLICATIONS

McGraw-Hill/Data Communications. McGraw-Hill's Compilation of Data Communications Standards. Edition III; 1986.

National Security Agency. Blacker Interface Control Document. Mar. 21, 1989.

Novell, Inc. IPX Router Specification, Version 1.10. Part No. 107-000029-001. Oct. 16, 1992.

Novell, Inc. NetWare Link Services Protocol (NLSP) Specification, Revision 0.9 Part No. 100-001708-001. Mar. 1993.

StrataCom. Frame Relay Specification with Extensions. 001-208966, Rev. 1.0; Sep. 18, 1990.

Xerox Corporation. Internet Transport Protocols. XNSS 029101; Jan. 1991.

Jan. 1, 1990, Ted Szymanski, An Analysis of "Hot-Potato" Routing in a Fiber Optic Packet Switched Hypercube, pp. 918-925.

Jan. 1, 1995, Bradner & Mankin, The Recommendation for the IP Next Generation Protocol, (http://www.ietf.org/rfc/rfc/1752.txt) pp. 1-49.

May 14, 1995, Robert M. Hinden, IP Next Generation Overview, (http://playground.sun.com/publipng/html/IN-ET-Ipng-Paper.html) pp. 1-21.

Policy-Based Routing, Internet white paper, http:!/www.cisco.com/warp/public/732/Tech/plicy--wp.htm posted Sep. 12, 1996.

Jul. 1, 1997, Bay Networks, White Paper: The Case for Ipv6, pp. 2-35.

Jan. 1, 1998, Ascend Communications, Inc., Ascend White Paper: Ascend MultiVoice Architecture Strategy From Dial-Tone to Data Tone, pp. 1-15.

Sep. 1, 1998, Gary Kim, Ascend White Paper: The Next Generation Public Network: Opportunities for CLECs and ISPs, pp. 1-48.

Using the Border Gateway Protocol for Interdomain Routing, http://www.cisco.com/univercd/cc/td!doc/cisintwk/ics/icsbgp4.htm, Sep. 10, 1998.

Jan. 1, 1999, Nortel Networks, The Succession Network, (http://www.nortelnetworks.com).

"Policy-Based Routing", Internet white paper, http:/www.cisco.com/warp/public/732/Tech/plicy_wp.htm, posted Sep. 12, 1996.

Jan. 1, 1990 An Analysis of "Hot-Potato" Routing in a Fiber Optic Packet Switched Hypercube Ted Szymanski 918-925.

Jan. 1, 1998 Ascend White Paper: Ascend MultiVoice Architecture Strategy From Dial-Tone to Data Tone Ascend Communications, Inc 1-15.

Office Action from Prosecution History file of U.S. Appl. No. 08/741,130.

Amendment and Remarks from Prosecution History file of the U.S. Appl. No. 08/741,130.

Memorandum Opinion in *Connectel, LLC* v. *Cisco Systems, Inc.*, Case No. 2:04-CV-396 (E.D. Tex. Apr. 11, 2006).

Connectel, LLC's Brief in Support of its Claim Construction in the prior litigation.

Declaration of Tim A Williams.

Declaration of Daniel R. McClure.

Newton, H., Newton's Telecom Dictionary ($6^{th}$ Ed. 1993) at 759 ("Newton's Telecom Dictionary").

Petition for Inter Partes Review of U.S. Patent No. 8,400,926, IPR2014-00905.

RF Network Selection in a Rule-Based System (published Sep. 1989) by Dillard and Olsen.

\* cited by examiner

MULTI-PROTOCOL TELECOMMUNICATIONS ROUTING OPTIMIZATION

RELATED APPLICATIONS

This application is a continuation of U.S. patent application Ser. No. 11/948,746, filed Nov. 30, 2007, now U.S. Pat. No. 8,400,926, issued Mar. 19, 2013, which is a continuation of U.S. patent application Ser. No. 10/157,611, filed May 29, 2002, now U.S. Pat. No. 7,307,956, issued Dec. 11, 2007, which is a continuation of U.S. patent application Ser. No. 09/665,399, filed Sep. 20, 2000, now U.S. Pat. No. 6,473,404, issued Oct. 10, 2002, which is a continuation of U.S. patent application Ser. No. 09/198,687, filed Nov. 24, 1998, now U.S. Pat. No. 6,144,641, issued Oct. 20, 2000, which is a continuation of U.S. patent application Ser. No. 08/741,130, filed Oct. 31, 1996, now U.S. Pat. No. 6,016,307, issued Jan. 18, 2000. The subject matter of each of these patent applications and/or patents is hereby incorporated by reference herein in their entireties.

BACKGROUND OF THE INVENTION

This invention relates to telecommunications, and in particular to a method and apparatus for dynamically selecting an optimal telecommunications path from a plurality of available paths in accordance with an analysis of both static and dynamically changing variables and user priorities.

The telecommunications industry has changed rapidly in recent times from the simple analog connection of telephones for voice communications to the present systems for transmitting and receiving data, facsimile, e-mail, video, audio, as well as voice in both analog and digital formats (referred to herein collectively as data). Data may be transmitted in any of various formats, such as a data file, data packets, encapsulated packets, or data streams (referred to herein as a data file). Various types of telecommunications systems have been and continue to be installed, which function as the backbone systems for transmission of data over numerous media. For example, data may be transmitted from one user to another by POTS (plain old telephone system), leased lines, mobile cellular networks, digital links, fiber optics, satellite links, and private and public packet switching networks such as the Internet.

In addition, there exists a great amount of pricing competition among service providers employing various types of these transmission media. For example, so-called long distance service providers such as AT&T and MCI offer rates in competition with each other in order to gain greater market shares of consumer, business, non-profit organizations, and governmental users. As a result of the numerous types of communications services available, as well as the competition between providers of these services, users are often faced with difficult choices regarding the selection of a service which will provide them with the best value.

Often, more than one communications service providers are available at a given time to a user for selection as a carrier of the data to be transmitted. For example, a user may subscribe to two or more long distance service providers, and may access either one a given time by first dialing the service provider's code, and then dialing the destination phone number. In addition, a user may have various types of media available for selection; i.e. the connection may be made via the Internet, satellite, etc. This is especially true in a business environment, where economic considerations allow numerous communications resources to be available for use.

The prior art generally recognizes low cost as being the factor upon which routing decisions are made for the transmission of data. As such, so-called "least cost routing" facilities proliferate, allowing a call to be placed with a service provider that provides the least cost a given time. PBX (private branch exchange) systems may employ such a least cost routing facility that automatically connects the calling party to the destination number along the cheapest route available.

The present invention recognizes that the best value for a communications medium at a given time is not necessarily the lowest cost of the choices available. That is, the optimization of routing selection encompasses not only a low cost, but also takes into account other factors such as transmission bandwidth of the medium, its availability at the specific time the user needs to use it, its security, and its reliability. In addition, a user's priorities may change from time to time, and the requirements regarding the transmission of one data file may be different than the requirements of another file. That is, a user may want to transmit one file in an emergency situation at the fastest speed, regardless of its cost. Other files may need high security from being illicitly intercepted, and yet other files may only need to be transmitted at the lowest cost at any time in the near future, with no speed concerns.

Thus, the present invention recognizes that the selection of the optimal route for data transmission at a given time is a dynamic analysis that must be done in real-time, and must take into account various factors regarding the available media as well as the priorities of the user and of the file to be transmitted.

U.S. Pat. No. 5,337,352 discloses a PBX system servicing a plurality of tenants, wherein each tenant may specify which of a plurality of routes should be selected as having the highest priority, then second highest priority, etc. The routing selections are predetermined by each tenant in accordance with their requirements and available resources, and the selections are stored in a table in the PBX. Once a tenant desires to place a call, the PBX looks in the table to determine the highest priority route for that particular tenant, and connects the call accordingly. If that route is not available, then the next priority route, according to the predetermined tenant table, is connected. Thus, a predetermined pecking order is established by each tenant and stored in the PBX. This system is static and not changeable on a real-time basis since each tenant must predetermine the priority of specific providers to utilize. Although the system of this patent checks the availability of the highest predetermined priority route and uses the next highest priority if it is unavailable, such analysis is only a discrete yes/no inquiry and does not take into account the current amount of traffic over the route to analyze the route's availability on a relative basis.

It is therefore an object of the present invention to overcome the shortcomings of the prior art systems as described above.

It is an object of the present invention to provide a system and method for selecting an optimal communications path for connecting a call to a remote location for the transfer of a data file thereover by analyzing on a real-time basis a set of multiple protocols.

It is a further object of the present invention to provide such a system and method for multi-protocol route optimization which analyzes the priorities of a user regarding the transmission of a particular data file in determining the optimal route for the call.

It is an even further object of the present invention to provide such a system and method for multi-protocol route optimization which analyzes various factors regarding the route on a real-time basis in determining the optimal route for the call.

It is an even further object of the present invention to provide such a system and method for multi-protocol route optimization which allows a user to override preset default values and specify critical transfer parameters on a file-by-file basis.

SUMMARY OF THE INVENTION

In accordance with these and other objects, provided is a communications switching system comprising a first memory for holding a data file to be transferred to a remote destination and a plurality of interfaces coupled with the first memory, wherein each of the interfaces is interconnected with an associated telecommunications path capable of transferring the data file to the remote destination. The switching system comprises a second memory for storing predetermined parameters associated with each of the telecommunications paths and means for measuring the value of variable parameters associated with each of the telecommunications paths. A third memory stores a set of user priorities regarding the transmission of data files. Processor means is operatively associated with the second and third memories and the variable parameter measuring means for determining which of the plurality of telecommunications paths should be utilized for transferring the data file in accordance with the set of user priorities, the predetermined communications path parameters, and the measured variable parameters. The switching system further comprises input means for allowing a user to change the user priorities in the third memory prior to transmitting a file.

For example, the variable parameter measuring means performs a measurement of the data transfer speed of each of the communications paths, for example by a so-called ping test. The predetermined parameters stored in the second memory comprises the cost per unit time of utilizing each of the communications paths, which may be a function of the current time of day and/or current day of week. The predetermined parameters stored in the second memory also comprises a measure of data transfer reliability of each of the paths as well as a measure of data transfer bandwidth of each of the paths. The switching system may also comprise means for ascertaining if an interface is available for data file transfer at a particular time.

In a method aspect utilizing the switching system of the present invention, provided is a method of determining which of a plurality of communications paths should be utilized for transferring a data file in accordance with a set of user priorities, the method comprising the steps of measuring variable parameters for each of said paths, analyzing the measured variable parameters and the predetermined parameters in relation to the user priorities; and determining which of the paths provides the characteristics desired by the user for transferring the file in accordance with the user's priorities.

DETAILED DESCRIPTION OF THE PREFERRED EMBODIMENT

Figure 1:
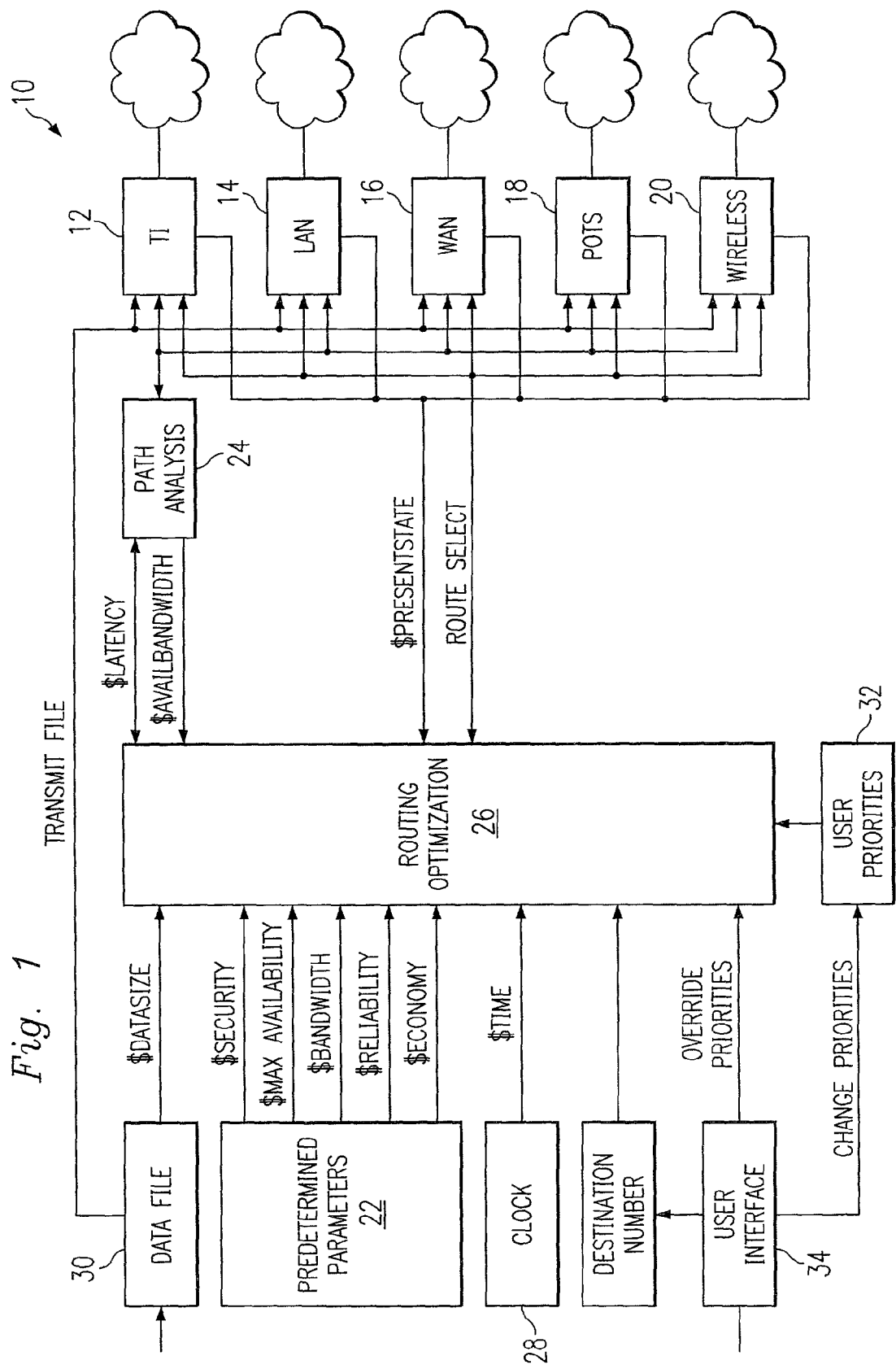
FIG. 1 is a functional block diagram of the switching system of the present invention utilizing multi-protocol routing optimization.

FIG. 1 illustrates a block diagram of the telecommunications switching system 10 of the present invention, which may be implemented for example on a personal computer platform, personal digital assistant (PDA), dedicated system such as a PBX, or the like. The switching system 10 is connected to various communications media in accordance with the user's resources. In particular, the switching system 10 may be configured to a high speed digital link via a T1 interface 12, to a local area network (LAN) via LAN interface 14, to a wide area network (WAN) via a WAN interface 16, to a local loop in a plain old telephone system (POTS) via POTS interface 18, and to a wireless communication network via wireless interface 20. The interfaces 12, 14, 16, 18 and 20 are exemplary and are provided for the purposes of illustrating the preferred embodiment of the present invention. Thus, in practice, any number of the aforementioned interfaces may be used alone or in any combination as required by the user. For example, a number of common carriers such as MCI, AT&T and SPRINT may be configured to the switching system 10 such that the user may take advantage of the relative benefits of each carrier via the multi-protocol routing optimization to be described herein. In addition, the wireless interface 20 may be configured for communications by any type of wireless communications such as infrared, radio frequency, optical, etc.

Each of the telecommunication media connected to the various interfaces of FIG. 1 has certain parameters associated therewith which are implemented by the routing methodology of the present invention. These parameters are classified by the routing methodology as being either predetermined (fixed) or measurable (variable). Data regarding the predetermined parameters are stored in a memory 22 in the switching system 10, while data regarding the measurable parameters must be collected by path analysis block 24 from each interface in real-time at or about the time the data file is transferred in order for the routing methodology to make a proper analysis.

Predetermined parameters stored in memory 32 include, but are not limited to, the following:

TABLE A

| | |
|---|---|
| $maxbandwidth (i): | the maximum amount of bandwidth available for interface (i). For example, a 28.8 kbs modem would have a $maxbandwidth variable set to 28.8. |
| $reliability (i): | an indication of the reliability of interface (i) according to the following scale:<br>10 = non-reliable transfer (e.g. wireless)<br>50 = moderately reliable (e.g. modem)<br>75 = very reliable (e.g. T1, WAN)<br>100 = ultra reliable (e.g. Ethernet LAN) |
| $economy (i): | the currency expenditure of interface (i) for a period of time, normalized so that a high cost interface yields a low measure of economy:<br>$economy (i) = 100 − cost/minute |
| $availability (i) | the availability of interface (i) to a particular user. Not all users of the system will have access to each interface; e.g. in a shared PBX environment only certain subscribers may have access to the T1 interface.<br>$availability = 0 Not available<br>$availability = 1 Available |

TABLE A-continued

| | |
|---|---|
| $security (i) | an indication of the relative data security of the path, which may example be a function of the number of bits in an encryption key (e.g. 1024) |

Measurable parameters include, but are not limited to the following:

TABLE B

| | |
|---|---|
| $presentstate (i) | the present state of interface (i), indicating if the telecommunications path is presently operational. $presentstate = 0 Not operational $presentstate = 1 Operational |
| $avgstate (i) | average of $presentstate (i) over prior five minute window |
| $datasize (i) | the size in KB of the data file to be transmitted. |
| $latency (i) | measure in msec of delay through path (i). This is based on a real-time test on the interface such as by a so-called ping to the remote host. |
| $time | time of day/day of week; this is the same for all interfaces. |
| $availbandwidth (i) | available bandwidth of interface (i) at a given time of file transfer |

Rather than simply relying on preprogrammed "least cost" routing criteria, the present invention utilizes all or a logical subset of the variables set forth in the Tables A and B above to arrive at a routing decision for a data file to be transmitted. That is, by employing the multi-protocol routing optimization of the present invention, the path chosen for transmission of a data file takes into account parameters which vary in real-time, thus not relying on a simple preprogrammed look-up table of low cost providers as in the prior art. In addition, the user can specify his priorities as to the parameters which are critical in transmitting a particular file, i.e. low cost, high speed, reliability, security, etc., in making the routing determination.

The methodology employed by the present invention is processed by routing optimization block 26 (which may be implemented in a microprocessor) and utilizes two main components comprising the parameters set forth in the Tables A and B above in varying combinations. The first component is a measure of an inherent efficiency and desirability of a particular telecommunications path, and is given by the following equation:

$$\$prevalue(i)=\$maxbandwidth(i)+\$reliability(i)+\$economy(i)+\$security(i) \quad (1)$$

The variable $prevalue is a linear value that increases with a high bandwidth, a high reliability, a high measure of economy (low cost) and/or a high degree of security of a particular path. This variable is essentially unchanging for a given path, except for the fact that the $economy parameter is based in part on the $time variable (cost of the path is a function of the time of day/day of week) which is derived from a real-time clock 28.

The second component utilized by the routing methodology of the present invention is based in part upon real-time parameters that may exhibit a wide variance due to numerous reasons, some of which may be beyond the control of the user:

$$\$currentvalue(i)=\$economy(i) \times \$speed(i)+\$avgstate(i) \times 10 \text{ where } \$speed(i)=10{,}000-(\$datasize(i) \times \$latency(i) \times 100) \quad (2)$$

so that:

$$\$currentvalue(i)=\$economy(i) \times (10{,}000-(\$datasize(i) \times \$latency(i) \times 100)+\$avgstate(i) \times 10$$

Thus, the $currentvalue(i) for a given path (i) will be higher for the path having a greater economy (low cost), a low data file size, and/or little latency through the path (high speed).

The selection of the optimal route to use is then a combination of the values calculated above in equations (1) and (2):

$$\$finalvalue(i) = \quad (3)$$
$$\$prevalue(i) + \$currentvalue(i) = \$maxbandwidth(i) + \$reliability(i) +$$
$$\$economy(i) + \$security(i) + (\$economy(i) \times (10{,}000 -$$
$$(\$datasize(i) \times \$latency(i) \times 100) + \$avgstate(i) \times -10)$$

The routing optimization methodology block 26 then takes the highest $finalvalue(i) for each path in the system that is available, operational, and meets a threshold ($avgstate×10) value of 25 or above as shown in the flowcharts to be described below. This methodology thereby allows the optimal selection based on an analysis of multiple protocols employed by the system, rather than simply a least cost routing decision.

Path analysis function block 24 obtains the value $latency (i) for each path(i) by any means known in the art for obtaining the latency of an IP addressable path, such as by well known software utility known as "ping." The ping routine sends a packet onto the network and obtains a value of the average delay encountered by that packet in reaching the destination and returning. Other techniques which allow the system to obtain a measure of the latency of the path are also encompassed by the present invention.

A user may customize the relative weights given to each of the variables set forth in Tables A, B in accordance with his specific requirements as stored in user priorities memory 32. These fixed weighting values would be stored in a memory in the switching system and used in conjunction with the routing methodology for all files transferred in accordance with the invention. The weighting values are used as multipliers for the variables in the algorithm in order to allow the user to customize the algorithm as desired. For example, a user may want to emphasize the $security(i) parameter in the analysis, and may then specify a weight multiplier of (for example) two so that the $security(i) parameter is weighted twice as much as if the $security(i) parameter were left in the default state.

In addition, a user may override via input to a user interface 34 the fixed parameter weights preprogrammed in memory for any given file transfer with temporary values. The user interface may be any type of device for allowing the user to input data, such as a keyboard, mouse, etc.

In another form of parameter weighting, the user may also force the program to ignore certain parameters and focus on one parameter only in arriving at a routing decision. For example, if a user wants to transmit a data file 30 to a remote location via the fastest path, regardless of cost or any other factor, then the user specifies this requirement to the routing optimization block 26 via the interface 34. The routing optimization block 26 will then cause all variables except for $latency to a predetermined factor, so that the path with the smallest value for $latency (i.e. the smallest routing delay) will be chosen by the routing optimization block 26 as being the fastest route.

Other permutations and variations of the above example can be easily derived by one skilled in the art to allow the user to specify his priorities as to data transfer of a file at any given point in time, e.g. the analysis may be forced to look at any two variables, etc.

In addition, a user may store certain sets of parameter weighting to be used in different situations, and then select the set when desired. The set of weights would then be applied as above described. Furthermore, the program may be configured to automatically apply certain weighting sets as a function of the data type. For example, the user may specify that all facsimile messages be given a high economy factor, while all video files be given a low security factor, etc.

Figure 2:
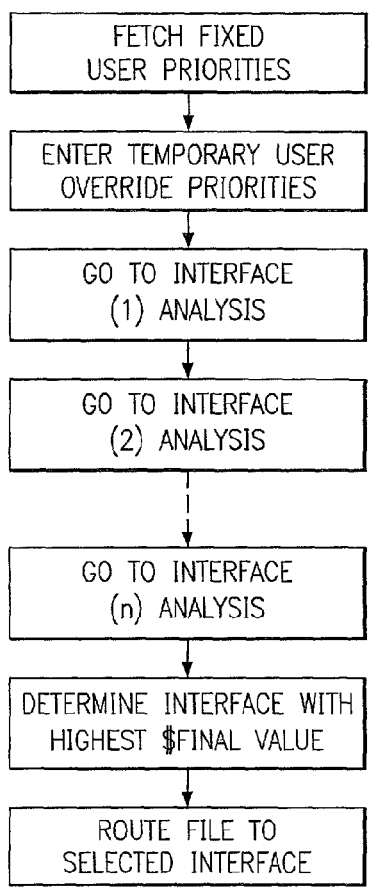
FIG. 2 is a flowchart of the main routine carried out by the present invention.
Figure 3:
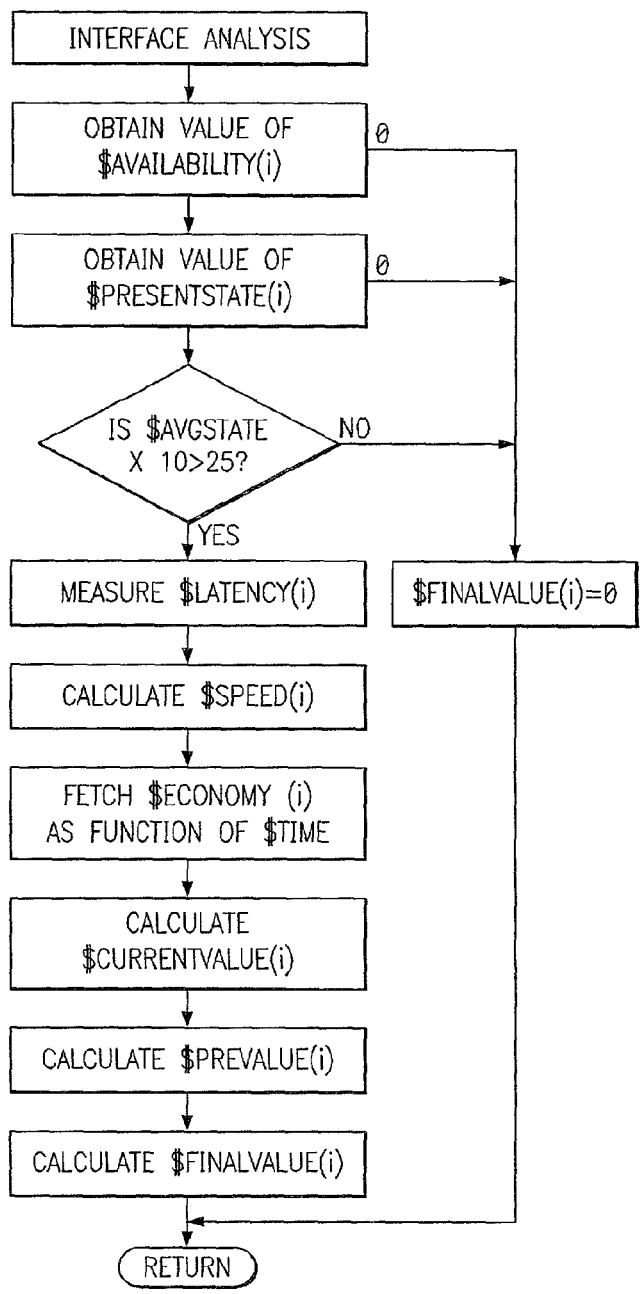
FIG. 3 is a flowchart of the interface analysis subroutine carried out by the present invention.

FIGS. 2 and 3 illustrate flowcharts of the methodology employed by the present invention in arriving at the optimal choice for routing a data file amongst a plurality of available paths in accordance with the present invention. First, as shown in FIG. 2, the fixed user priorities are fetched so that the parameters used in the analysis may be weighted accordingly. The user is then allowed to enter his temporary priority override values for the file transfer. Assuming for this example that no fixed weighting or temporary override values are entered, then the $finalvalue parameter is determined for each of the paths(i) in the switching system 10 in the following manner.

First, with reference to FIG. 3, the routing optimization block 26 checks with memory 22 to determine if that interface (i) has been programmed as being available to be used by that user be observing the variable $availability(i). For example, if the switching system 10 is embodied in a PBX system, then not all users will have access to all paths(i) due to their economic resources. This information is contained in memory 22 and checked as a first step in the process of FIG. 3.

If $availability(i)=0, then $finalvalue(i) is set to zero and the routine is exited. If, however, the interface(i) is available, the $availabilty(i) is set to 1 and the process proceeds. The routine then checks the to see if the path(i) is operable at that time, and the $presentstate variable is returned from the $interface(i) accordingly. If $presentstate(i)=0 (path inoperable or down), then $finalvalue(i) is set to zero and the routine is exited. If $presentstate(i)=1 (path operable or up), then the routine proceeds.

The variable $avgstate is then checked to ensure that it is greater than a predetermined threshold value, e.g if $avgstate×10>25. If this is true, then the interface(i) is considered to be essentially in operable condition. If false, then the interface(i) is considered to be in essentially non-operable condition, notwithstanding the fact that the $presentstate indicates operability at that particular time.

The routine then proceeds to obtain the $latency(i) value via path analysis block 24. Using $latency(i), the variable $speed(i) is calculated as shown in the flowchart and explained above. The variable $economy(i), which is a function of the $time variable, is obtained from the memory 22. Then, the variable $currentvalue(i) is calculated as a function of $economy(i), $speed(i), and $avgstate(i).

The variable $prevalue(i) is then calculated as a function of the variables $maxbandwidth(i), $reliability(i), and $security (i), which are obtained from the memory 26, as well as $economy(i) which was previously determined. Finally, the variable $finalvalue is obtained as shown in the routine, and this is stored in a register pending calculation of $finalvalue(i) for the remaining interfaces as shown in FIG. 2.

After all the interfaces have been analyzed in the above manner, then the routing optimization block 26 makes a determination as which interface(i) should be selected in accordance with the highest value for $finalvalue(i). The data file is then routed from the memory 30 to the selected interface for transmission.

The routines shown in FIGS. 2 and 3 may be supplemented by the user priority override features described above, which allow the user to specify the fastest route, the least cost rout, the most reliable route, etc.

The measurable parameter $availbandwidth(i) may also be utilized in the algorithms presented herein to provide a real-time indication of the desirability of selecting a particular interface(i) at a given time. Although the fixed parameter $maxbandwidth(i) provides a measure of the maximum bandwidth that may be available for a given interface, the interface can be tested if desired in order to determine what portion of that bandwidth is actually available for use. One test known in the art for accomplishing this measurement is the so-called "show interface serial zero" test, which may be performed by measuring the amount of packets received in the last n seconds as well as how many packets have been transmitted on the interface in that time. Thus, the parameter $availbandwidth may be used instead of, or in conjunction with, the measured parameter $latency to perform the analysis herein.

In addition, while the system and method of the present invention has been shown in conjunction with the transmission of one data file (as defined herein), it may be also applicable to the transmission of multiple data files in either a serial or parallel (interleaved) basis, by modification of the algorithm and routines as may be appropriate.

The choice of particular variables and parameters used herein is the preferred embodiment; it is anticipated that other variables may be used in conjunction with the present invention to arrive at the optimal route in a given situation. In addition, the particular algorithm, while determined to provide a requisite relative weighting of the fixed and measured variables, may also be supplemented in accordance with the requirements of the user in order to arrive at the optimal routing choice.

What is claimed is:

1. In a communications switching system comprising a plurality of interfaces, each of the interfaces interconnected with at least one of a plurality of communications paths capable of transferring data to a remote destination, the communications paths including at least one plain old telephone system (POTS) path, one or more of the communications paths having at least one predetermined parameter associated therewith, a system for determining which of the plurality of communications paths should be utilized for transferring the data, said system for determining comprising at least one processor that:
   determines a data type of the data to be transferred;
   measures at least one variable parameter for at least one of said communications paths; and
   determines which of the communications paths provides an optimal set of characteristics for transferring the data to the remote destination in accordance with the at least one measured variable parameter, the at least one predetermined parameter, and the data type.

2. The system of claim 1, wherein the at least one variable parameter corresponds to an available bandwidth on the at least one of said paths.

3. The system of claim 2, further comprising:
   at least one interface, coupled to the at least one processor, for transmitting the data to the remote destination over the path determined to provide the optimal characteristics;

wherein the at least one variable parameter corresponds to the available bandwidth of the at least one of said paths when the data is transmitted to the remote destination.

4. The system of claim 1, wherein the at least one variable parameter corresponds to an operational state of the at least one of said paths.

5. The system of claim 4, further comprising:
at least one interface, coupled to the at least one processor, for transmitting the data to the remote destination over the path determined to provide the optimal characteristics;
wherein the at least one variable parameter corresponds to the operational state of the at least one of said paths when the data is transmitted to the remote destination.

6. The system of claim 3, wherein the determining the data type of the data to be transferred consists of determining whether the data to be transferred corresponds to a facsimile data type or a further different data type.

7. The system of claim 5, wherein the determining the data type of the data to be transferred consists of determining whether the data to be transferred corresponds to a facsimile data type or a further different data type.

8. The system of claim 3, wherein the determining the data type of the data to be transferred consists of determining whether the data to be transferred corresponds to a video data type or a further different data type.

9. The system of claim 5, wherein the determining the data type of the data to be transferred consists of determining whether the data to be transferred corresponds to a video data type or a further different data type.

10. The system of claim 3, wherein the at least one of said paths is a wireless link.

11. The system of claim 5, wherein the at least one of said paths is a wireless link.

12. The system of claim 10, wherein the at least one processor is included in a personal communication device coupled to said at least one interface, wherein said at least one interface is a wireless interface.

13. The system of claim 11, wherein the at least one processor is included in a personal communication device coupled to said at least one interface, wherein said at least one interface is a wireless interface.

14. The system of claim 3, wherein the at least one of said paths is a fiber optic link.

15. The system of claim 14, wherein the data to be transferred corresponds to data packets.

16. The system of claim 5, wherein the at least one of said paths is a fiber optic link.

17. The system of claim 14, wherein the data to be transferred corresponds to data packets.

18. The system of claim 1, wherein the at least one processor determines the path that provides an optimal set of characteristics for transferring the data to the remote destination in accordance with whether the data comprises an emergency message.

19. A telecommunications switching system comprising:
a plurality of interfaces, each of said interfaces interconnected with an associated telecommunications path capable of transferring a data file to a remote destination;
a predetermined parameter associated with each associated telecommunications path stored in memory; and
a processor capable of determining which associated telecommunications path should be utilized for transferring the data file to the remote destination by taking into account the associated predetermined parameter and a variable parameter associated with the telecommunications path measured by the processor.

20. The system of claim 19, wherein the processor is included in a personal communication device coupled to at least one of said plurality of interfaces, wherein said at least one of said plurality of interfaces is a wireless interface.

* * * * *